May 16, 1939.   C. C. CHAFFEE   2,158,353
METHOD OF PRODUCING HYDROCARBONS SUITABLE FOR MOTOR FUEL
Filed April 19, 1935
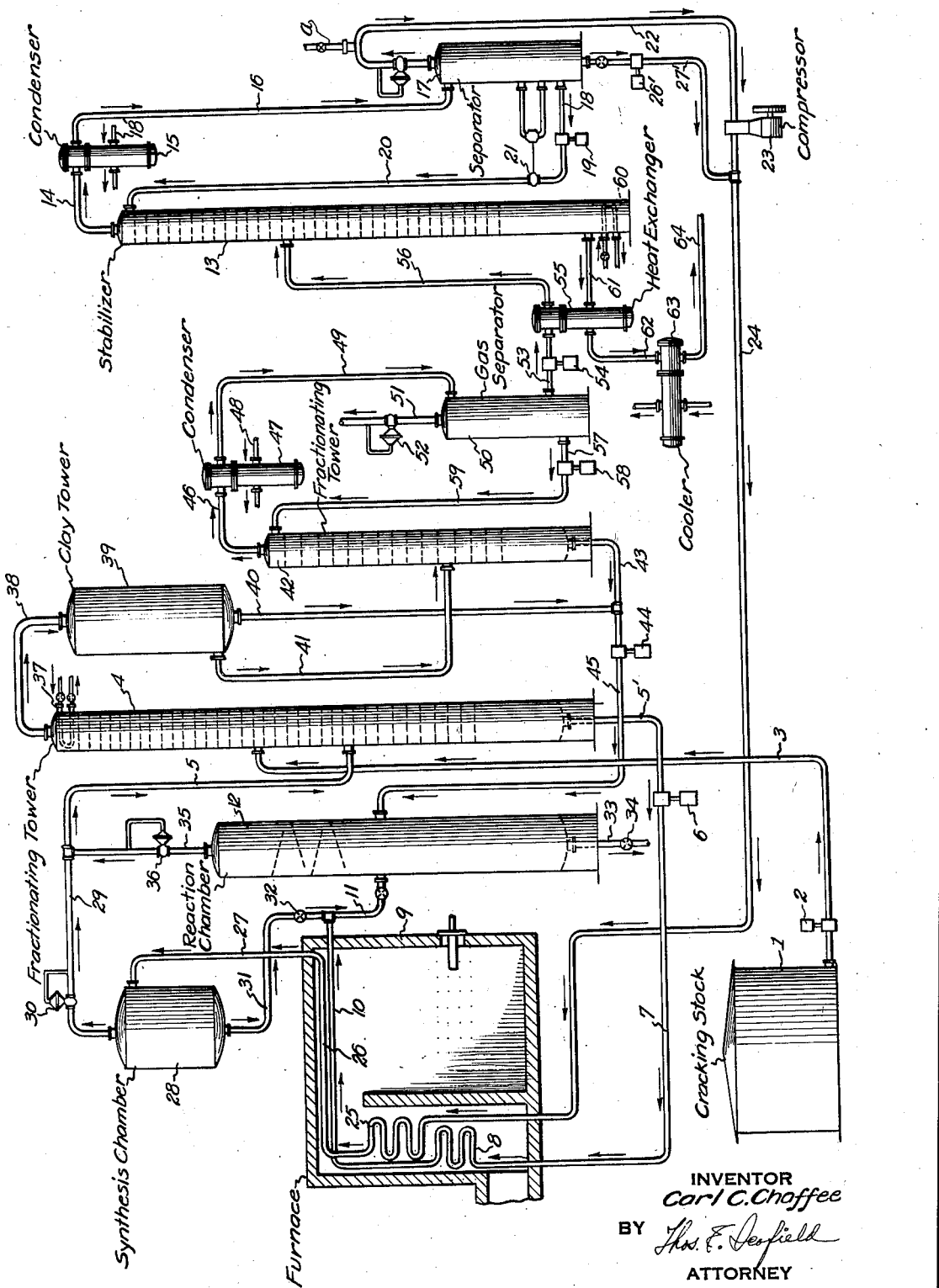
INVENTOR
Carl C. Chaffee
BY
ATTORNEY Patented May 16, 1939

2,158,353

UNITED STATES PATENT OFFICE 2,158,353

METHOD OF PRODUCING HYDROCARBONS SUITABLE FOR MOTOR FUEL

Carl C. Chaffee, Ponca City, Okla., assignor to Continental Oil Company, Ponca City, Okla., a corporation of Delaware Application April 19, 1935, Serial No. 17,229

5 Claims. (Cl. 196—47)

My invention relates to a method for producing hydrocarbons suitable for use as a motor fuel and more particularly to a combined process of pyrolytic decomposition and pyrolytic synthesis.

In the pyrolytic decomposition of hydrocarbon oils, fixed gases and particularly such hydrocarbon gases as methane, ethane, ethylene, propane, propylene, butane, and butylene are formed. These gases may be subjected to a process of pyrolytic synthesis in order to polymerize them to liquid hydrocarbons suitable for use as a motor fuel. The equipment for thus polymerizing the refinery gases is costly. The yields resulting from the polymerization are usually low, the recovery of the desirable products is not easy, and their refining is difficult. Furthermore, during the polymerization, heavy gummy polymers are formed which must be separated from the desirable liquid products.

One object of my invention is to provide a combined process of pyrolytic decomposition or cracking and pyrolytic synthesis or polymerization for the production from high boiling, normally liquid hydrocarbons and normally gaseous hydrocarbons of a motor fuel having a high antiknock rating, lower molecular weight, higher A. P. I. gravity, and a lower potential gum content than those motor fuels obtained either from pyrolytic decomposition or polymerization processes.

Another object of my invention is to provide a combined cracking and polymerization process using a minimum amount of heat, applied under controllable conditions.

Another object of my invention is to provide a combined cracking and polymerization process in which the formation of heavy gum-like polymers is reduced and the refining of the distillate made facile.

Another object of my invention is the separation of hydrogen sulphide and other fixed gases from the polymerizable hydrocarbons. The polymerized material contains less sulphur and is therefore more valuable.

Other and further objects of my invention will appear from the following description.

The accompanying drawing is a schematic view showing one form of apparatus capable of carrying out the process of my invention.

In general, my invention contemplates, first, the cracking of a hydrocarbon oil. The cracking process may be of any desired type. It may be liquid phase, liquid-vapor phase, or vapor phase cracking of any of the known types. The gases formed during the cracking operation are separated and subjected to polymerization. A separation of the liquid polymers and the gases is made in the synthesis chamber. The liquid polymers are withdrawn and injected into the transfer line of the cracking stock as it leaves the cracking furnace. With my process, the gases which are subjected to polymerization in the synthesis chamber are free of hydrogen, oxygen, and hydrogen sulphide. The liquid polymers admixed with the hot products of the pyrolytic decomposition are passed into a high pressure reaction chamber in which further polymerization occurs in the presence of hydrogen. Inasmuch as polymerization is an exo-thermic reaction and cracking is an endo-thermic reaction, the blending of the reacting products withdrawn from the polymerization and cracking zones tends to reach an equilibrium. Gases are formed by over cracking and heavy liquids are formed by over polymerization. The admixture of the over polymerized, viscous liquids with the over cracked light gases in the reaction chamber allows a second reaction of polymerization to occur in which the heavy tar and light polymers are converted into lighter products suitable for use as motor fuel. The reaction is probably due to the presence of hydrogen and can be considered in part as the hydrogenation of the heavy polymers. The vapors are withdrawn from the reaction chamber which is maintained under high pressure and passed into a fractionating tower also maintained under pressure. The vapors withdrawn from the fractionating tower are passed through a clay treating tower in the vapor phase in which a further degree of polymerization of the olefinic gases occurs. The heavy polymers formed in the clay tower are recycled to the reaction chamber, while the treated vapors are passed into a fractionating tower in which a separation of the heavier liquid fractions unsuitable for use as a motor fuel is made. These fractions are passed with the liquid polymers from the clay tower to the reaction chamber. The vapors are condensed under pressure and the gasoline-like distillate stabilized under pressure. In a stabilizer, a separation of the gases suitable for use as a charging stock to the pyrolytic synthesis operation is made. The stabilized gasoline is withdrawn and will be found to be suitable for use as a motor fuel, being a blend of hydrocarbons having a higher A. P. I. gravity generally of lower molecular weight and of lower gum content than like motor fuels within the same boiling range.

More particularly referring now to the drawing, the hydrocarbon oil to be subjected to pyrolytic decomposition is stored in tank 1. In the form of the process shown in the drawing, the oil is such that it may be completely vaporizable in a pipe still so that a vapor phase cracking operation may be carried on. For example, the oil may be the overhead fractions obtained from topping a crude to 26½ A. P. I. gravity. The oil is pumped by pump 2 through line 3 and charged into a fractionating tower 4 countercurrent to the hot vapors and gases passing thereinto through line 5 as will be hereinafter more fully described. The heaviest fraction of reflux condensate from the fractionating tower 4 is withdrawn through line 5' and pumped by pump 6 through line 7, through pipe coil 8, which is heated mainly by convection heat in the furnace 9. From the convection pipe coil 8 the oil passes through radiantly heated tube bank 10 and passes into transfer line 11 which leads into the reaction chamber 12. The pressure maintained in the cracking coils 8 and 10 may be from 200 to 750 pounds per square inch, and the temperature to which the oil is heated may be from 700° to 1300° F. It will be understood, of course, that if heavier charging stock is used, the cracking process may be in the liquid phase or liquid-vapor phase depending upon the pressure employed.

Simultaneously with the above operation, stabilizer 13 is so operated, preferably at a pressure from 250 to 350 pounds per square inch, so that the products removed overhead through line 14 will form a desirable feed for the pyrolytic synthesis step, and a liquid reflux for the tower. A typical analysis of the gas removed through line 14 before the polymerization cycle is started is as follows:

|  | Per cent |
|---|---|
| Methane | 13.9 |
| Ethane | 12.9 |
| Ethylene | 12.0 |
| Propane | 22.1 |
| Propylene | 23.6 |
| Butane | 9.0 |
| Butylene | 6.4 |

It is to be noted that the gas removed through line 14 from the stabilizer is free of hydrogen, oxygen, and hydrogen sulphide. Some of the heavier hydrocarbons will be condensed by condenser 15, the amount of condensation depending upon the temperature of the cooling water which is passed through the condenser through line 18'. The condensate and the uncondensed gases pass through line 16 into the separator 17, whence a portion of the condensate is withdrawn through line 18 and pumped by pump 19 through line 20 to the stabilizer 13 as reflux. The flow through line 20 is controlled by flow control valve 21. Gases are removed from the separator through line 22, compressed by compressor 23 and passed through line 24 to convection tube bank 25. A portion of the condensate is pumped from the separator 17 by pump 26' through line 27' and joined with the compressed gaseous hydrocarbons to form the complete polymerization feed which passes through line 24. Alternate methods of operation would comprise polymerization of liquid alone while venting gas through line "a". By closing the valve in line 27', the gas only may be polymerized. The compressed hydrocarbons are heated first by convection heat in tube bank 25 and then by radiant heat in tube bank 26. The temperature of heating may vary from 350° F. to 1200° F., and the pressure may be between 350 and 2500 pounds per square inch. In the particular operation being described, in which the gas mixture was constituted as described above, a temperature of 1000° F. and a pressure of 1000 pounds per square inch was found to give the best result. The heating of the gases converts the paraffinic hydrocarbons in particular to olefinic hydrocarbons. The gases thus heated and under pressure are passed through transfer line 27 into the synthesis chamber 28 in which polymerization takes place. The polymerization reaction will occur in absence of a catalyst. If desired, the chamber may contain a suitable catalyst such as phosphoric acid dispersed in kieselguhr or similar absorbent earths, kieselguhr alone, absorbent silicia gel, fuller's earth, activated charcoal, or mixtures involving the above catalysts or catalysts similar thereto.

A time interval is permitted for polymerization in the synthesis chamber. It will be readily understood by those skilled in the art that the time interval will depend upon the composition of the gas being charged, the temperatures employed and the pressures involved. As a result of the pyrolytic synthesis, a wide range of hydrocarbons having higher boiling points than the original gases is formed. Those which remain in the gaseous or vapor state are removed from the synthesis chamber through line 29, which is controlled by pressure control valve 30. The liquid polymers include many heavy hydrocarbons, some of which are viscous. These hydrocarbons are generally removed in the polymerization processes of the prior art. In the instant process, they are withdrawn through line 11, together with the products from the cracking step. It will be observed that the liquid polymers and the cracked products are commingled and pass through the line 11 into the reaction chamber 12. However, line 31 may be connected directly with reaction chamber 12. In the reaction chamber, a reformation of the heavy polymers takes place, due to the presence of hydrogen which results from the cracking of oil in coils 8 and 10. Some of the olefinic hydrocarbons formed during the cracking operation will polymerize. The hydrogen present will form with some of the heavier polymers, lower boiling hydrocarbons. At the temperatures involved and at the pressures existing, it being understood that the reaction chamber is maintained under high pressure, the desirable hydrocarbons will be in the vapor phase. The heavier polymers and the high boiling fractions will collect in the bottom of reaction chamber 12, from which they are withdrawn through line 33, controlled by valve 34, as fuel oil. The hot vapors are withdrawn from the reaction chamber through line 35, which is provided with valve 36. Both the hot vapors and gases from line 29 and the hot vapors and gases from line 35 are joined in line 5 which passes into the fractionating tower 4. The heat of the hot gases and vapors serves to strip the gasoline-like fractions from the charging stock. If desired, the pipe 5 may open into the fractionating tower 4 at a lower point so that the hot gases can be used to strip the bottoms of the tower 4. The upper portion of the fractionating tower 4 is provided with a reflux condenser 37 in order to provide reflux for fractionation. The gas and vapors are withdrawn from the fractionating tower 4 through line 38 and pass directly through a clay tower 39. In the clay tower, which may be of the Gray process type, vapor treatment of the distillate occurs. During this treatment, some of the color and gum forming compounds will be polymerized forming liquid polymers which are withdrawn through line 40. The treated vapors are withdrawn from the clay tower through line 41 and passed into fractionating tower 42 in which further separation of the heavier hydrocarbons and polymers is made. The heavy liquids are withdrawn from the fractionating tower 42 through line 43 into which the liquid polymers from the clay tower are passed and the combined liquid products pumped by pump 44 through line 45 into the reaction chamber 12, in order to permit a further reforming in the presence of hydrogen. The vapors and gases are removed from the fractionating tower 42 through line 46 and subjected to condensation in condenser 47 into which cooling water is passed through line 48. The condensate and uncondensed gases leave the condenser through line 49 and pass into a high pressure separator 50 which is maintained under pressure (240 pounds per square inch).

The operation is such that a large quantity of methane, oxygen, hydrogen, some ethane, and a small portion of gas of higher molecular weight will be removed from the separator 50, through line 51, which is controlled by pressure control valve 52. At the pressures and temperatures employed, the hydrocarbon gases desirable for polymerization feed will be in the liquid state and are removed through line 53 by pump 54 and pumped through heat exchanger 55 through line 56 into the stabilizer tower 13. A portion of the unstabilized gasoline is withdrawn from separator 50 through line 57 and pumped by pump 58 through line 59 to the fractionating tower 42 as reflux. A steam coil 60 is provided in stabilizer 13 for reboiling. The stabilizer is operated as pointed out hereinabove at a pressure of from 250 to 350 pounds. The finished stabilized gasoline is withdrawn through line 61, passed through heat exchanger 55, through line 62, through cooler 63, and through line 64 to storage.

The total number of molecules of fixed gas leaving the high pressure separator is increased in proportion to the increase in volume passing through separator. Hence the unstabilized gasoline leaving the separator and being charged to the stabilizer contains a higher percentage of low molecular weight hydrocarbons than would be obtained without the recycling. The total quantity of unsaturated material leaving the top of the stabilizer reflux drum for recompression and recycling through the polymerization process is increased by the larger quantity of low molecular weight hydrocarbons transferred from the separator to the stabilizer. This means that a higher yield of polymerized product is obtained by virtue of the recycling of polymerizable material and avoids the objectionable features of too large an amount of gas in the system for the equipment to handle in its normal cracking operation.

In operating a cracking process which was charging 3000 barrels per day of a crude (which was topped to give a 26½ gravity fuel oil), the yield of pressure distillate was 51 percent. 500,000 cubic feet of stabilizer gas was obtained, containing 30 percent propylene and butylene, the stabilizer being operated from 250 to 350 pounds per square inch pressure. With my improved process in which the stabilizer gas was charged to the polymerization steps, 75 percent of the propylene and butylene was converted to gasoline within the desired boiling range. This gave an increase in the gasoline yield of 50 barrels per day, bringing the total over all yield of the unit from 51 percent to 53 percent. The octane number of the pressure distillate was increased.

It will be observed that I have accomplished the objects of my invention. Higher yields of desirable motor fuel are obtained, the polymerization steps are carried out in stages accurately controlled to provide the necessary conditions for carrying out the desired reactions. A fully refined product requiring no special recovery equipment is recovered. Full advantage is taken of the heat present in the gas leaving the synthesis chamber. The quantity of gum polymers formed in the usual polymerization process is reduced and the yield of desirable product increased by recycling.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. The method of forming hydrocarbons suitable for use as a motor fuel including the steps of heating a hydrocarbon oil to cracking temperature, simultaneously heating hydrocarbon gases previously separated in the process to temperatures sufficiently high to initiate pyrolytic synthesis, allowing a time period of reaction in a polymerization zone whereby a portion of the hydrocarbon gases is converted into liquid hydrocarbons, withdrawing the unconverted gases from the polymerization zone, separately withdrawing the liquid hydrocarbons from the polymerization zone and admixing them with the hydrocarbon oil heated to cracking temperature, allowing the products of the cracking step and the liquids withdrawn from the polymerization zone to react in a reaction zone, withdrawing the vapors and gases from the reaction zone, dephlegmating the vapors, contacting the vapors with a treating agent of the clay type, fractionating the vapors, condensing the vapors under pressure, separating hydrogen and some light hydrocarbons from the condensate, subjecting the condensate to stabilization, withdrawing normally gaseous hydrocarbons from the stabilization zone as the gaseous hydrocarbons previously separated in the process, compressing the gaseous hydrocarbons and passing them to the synthesis heating step.

2. A process as in claim 1 wherein the hydrocarbons in the gaseous and vapor state are withdrawn from the polymerization zone and passed to the dephlegmating step together with the vapors and gases withdrawn from the reaction zone.

3. A process as in claim 1 wherein the gases and vapors withdrawn from the polymerization zone are passed counter-current to the hydrocarbon oil to be cracked in the dephlegmating zone and reflux condensate from the dephlegmating zone is withdrawn therefrom and passed to the cracking zone as the hydrocarbon oil to be cracked.

4. A process as in claim 1 in which reflux condensate from the fractionating zone is introduced into the reaction zone.

5. A method for producing gasoline-like hydrocarbons suitable for use as a motor fuel including the steps of heating a hydrocarbon oil to temperatures of active pyrolytic decomposition; simultaneously heating normally gaseous hydrocarbons to temperatures of active pyrolytic synthesis; allowing a time interval of synthesis in a polymerization zone in which liquid hydrocarbons are formed; withdrawing unconverted gases from the polymerization zone, separately withdrawing the liquid hydrocarbons from the polymerization zone and while substantially at reaction temperature commingling them, with the hydrocarbons heated to active temperatures of pyrolytic decomposition, allowing a time period of reaction between the freshly cracked and freshly polymerized material in a reaction zone; withdrawing the vapors and gases from the reaction zone; dephlegmating the vapors; condensing the vapors and separating from the condensate, normally gaseous hydrocarbons.

CARL C. CHAFFEE.